US012768213B2

(12) United States Patent
Sogamoto et al.

(10) Patent No.: US 12,768,213 B2
(45) Date of Patent: Oct. 20, 2026

(54) OPENING AND CLOSING DEVICE

(71) Applicants: AISIN CORPORATION, Kariya (JP); TOYOTA JIDOSHA KABUSHIKI KAISHA, Toyota (JP)

(72) Inventors: Daichi Sogamoto, Kariya (JP); Kimihide Kato, Kariya (JP); Takayuki Sengoku, Kariya (JP); Satoshi Takato, Nagoya (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 527 days.

(21) Appl. No.: 18/352,436

(22) Filed: Jul. 14, 2023

(65) Prior Publication Data

US 2024/0044195 A1 Feb. 8, 2024

(30) Foreign Application Priority Data

Aug. 3, 2022 (JP) ................................ 2022-123984

(51) Int. Cl.
*E05F 15/622* (2015.01)

(52) U.S. Cl.
CPC ......... *E05F 15/622* (2015.01); *E05Y 2900/50* (2013.01)

(58) Field of Classification Search
CPC ........................... E05F 15/622; E05Y 2900/50
See application file for complete search history.

(56) References Cited

U.S. PATENT DOCUMENTS 4,118,131 A * 10/1978 Schnitzius ................ F16F 9/54 403/141
6,089,640 A * 7/2000 Cart ....................... B60J 1/1884 296/146.8
9,291,194 B2 * 3/2016 Strobel ............... F16C 11/0638
10,100,906 B2 * 10/2018 Fischer ................... F16H 25/20
12,196,253 B2 * 1/2025 Sogamoto ............. E05F 15/611
(Continued)

FOREIGN PATENT DOCUMENTS

DE 202011109569 U1 * 3/2012 ............. F16C 11/06
GB 2 123 479 A 2/1984
JP 59-17017 A 1/1984
(Continued)

*Primary Examiner* — Faye M Fleming
(74) *Attorney, Agent, or Firm* — Oblon, McClelland, Maier & Neustadt, L.L.P.

(57) ABSTRACT

An opening and closing device couples together a vehicle body having an opening and an opening and closing body that opens and closes the opening, and extends to perform an opening operation of the opening and closing body, at least one of the vehicle body and the opening and closing body including a ball stud including a ball, the opening and closing device including: a shaft member having a shaft shape and being telescopic in an axial direction; a socket fixed to at least one end portion of the shaft member and constituting a ball joint together with the ball; an elastic body supported by the socket and configured to hold the ball together with the socket; and a cover mounted on the socket at one of an allowing position where displacement of the elastic body with respect to the socket is allowed and a restricting position where the displacement of the elastic body with respect to the socket is restricted.

3 Claims, 9 Drawing Sheets

(56) References Cited

U.S. PATENT DOCUMENTS

| | | | | |
|---|---|---|---|---|
| 2014/0366662 | A1 | 12/2014 | Fischer | |
| 2019/0063490 | A1* | 2/2019 | Sakiyama | F16C 11/0623 |

FOREIGN PATENT DOCUMENTS

| | | | | |
|---|---|---|---|---|
| JP | H074129 | U | * | 1/1995 |
| JP | 2003278439 | A | * | 10/2003 |
| JP | 2015-505015 | A | | 2/2015 |
| JP | 5963880 | B2 | | 8/2016 |

* cited by examiner

OPENING AND CLOSING DEVICE

CROSS REFERENCE TO RELATED APPLICATIONS

This application is based on and claims priority under 35 U.S.C. § 119 to Japanese Patent Application No. 2022-123984, filed on Aug. 3, 2022, the entire content of which is incorporated herein by reference.

TECHNICAL FIELD

This disclosure generally relates to an opening and closing device.

BACKGROUND DISCUSSION

JP 2015-505015 A discloses a vehicle including a vehicle body having a door opening, a back door that opens and closes the door opening, and an opening and closing device that drives the back door. The opening and closing device has a shaft shape and is configured to be telescopic in an axial direction. The opening and closing device includes a socket that constitutes a ball joint together with a ball fixed to the vehicle body at a first end in the axial direction. On the other hand, the opening and closing device includes a socket that constitutes a ball joint together with a ball fixed to the door at a second end in the axial direction. In this way, the opposite end portions in the axial direction of the opening and closing device are individually coupled to the vehicle body and the back door. The opening and closing device extends to perform an opening operation of the back door. On the other hand, the opening and closing device contracts to perform a closing operation of the back door.

A need thus exists for an opening and closing device which is not susceptible to the drawback mentioned above.

SUMMARY

An opening and closing device that couples together a vehicle body having an opening and an opening and closing body that opens and closes the opening, and extends to perform an opening operation of the opening and closing body, at least one of the vehicle body and the opening and closing body including a ball stud including a ball, the opening and closing device including: a shaft member having a shaft shape and being telescopic in an axial direction; a socket fixed to at least one end portion of the shaft member and constituting a ball joint together with the ball; an elastic body supported by the socket and configured to hold the ball together with the socket; and a cover mounted on the socket at one of an allowing position where displacement of the elastic body with respect to the socket is allowed and a restricting position where the displacement of the elastic body with respect to the socket is restricted.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle including an opening and closing device will be explained.

Configuration of Present Embodiment

Figure 1:
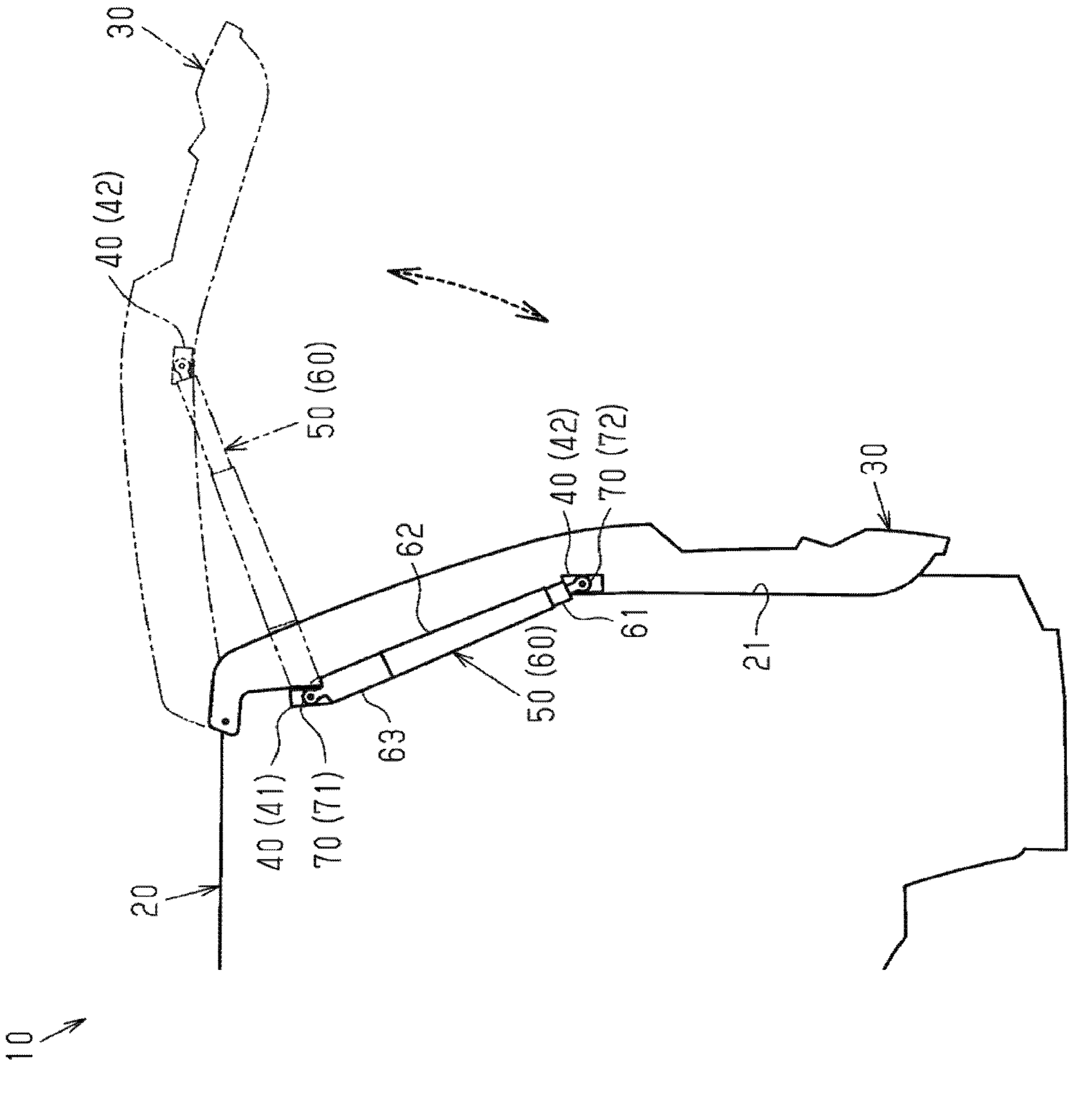
FIG. 1 is a side view of a rear portion of a vehicle.

As illustrated in FIG. 1, a vehicle 10 includes a vehicle body 20, a back door 30, and two opening and closing devices 50.

<Vehicle Body 20>

The vehicle body 20 includes a door opening 21 that opens rearward and two ball studs 41 (40) provided on opposite sides of the door opening 21. The door opening 21 has, for example, a rectangular shape whose longer direction coincides with a width direction of the vehicle 10 and whose shorter direction coincides with a vertical direction of the vehicle 10. The door opening 21 corresponds to an "opening". The ball studs 41 are located closer to an upper end than to a lower end of the door opening 21.

Figure 2:
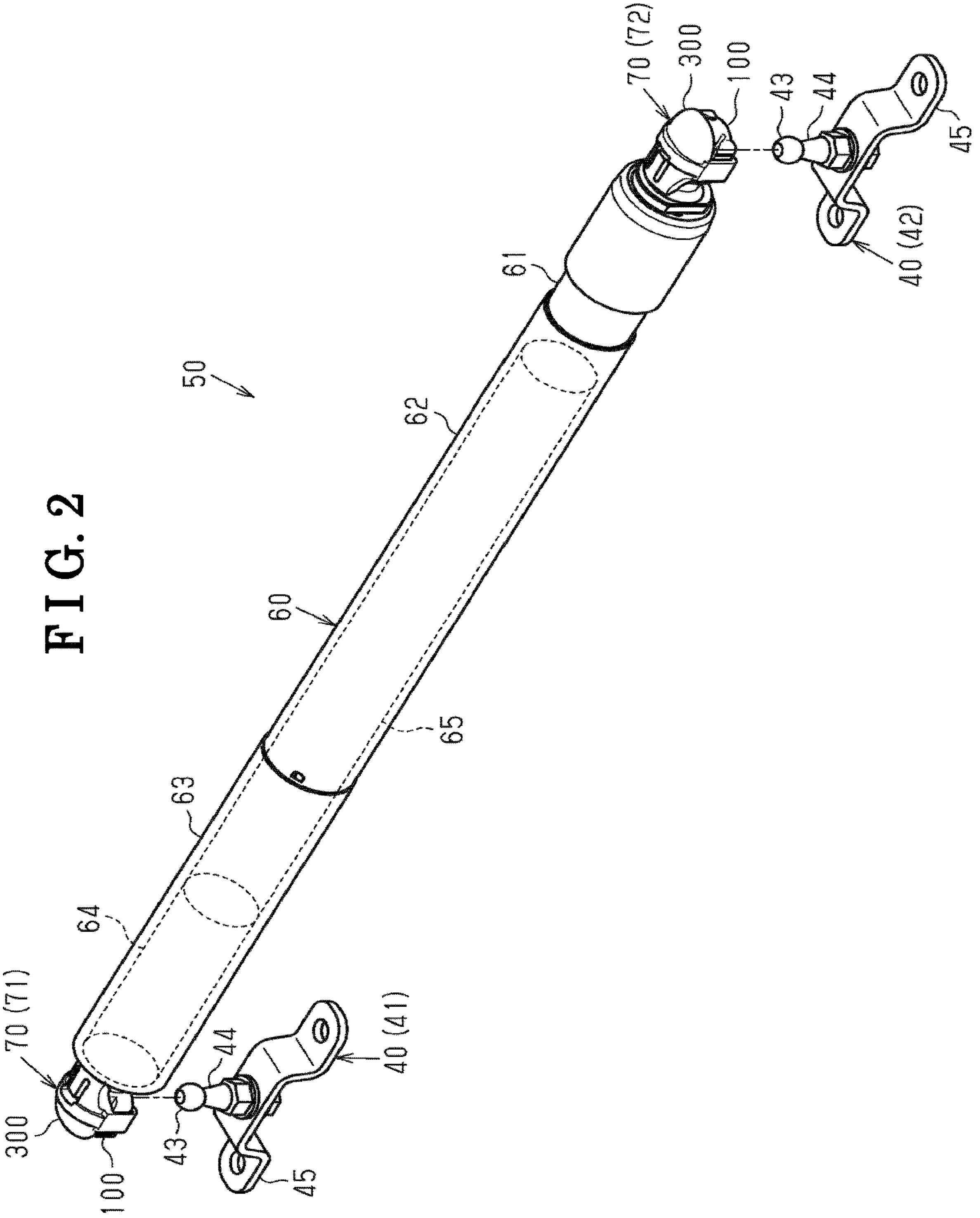
FIG. 2 is a perspective view of an opening and closing device.

As illustrated in FIG. 2, each ball stud 41 includes a ball 43, a shaft portion 44 that extends from the ball 43, and a bracket 45 that supports the shaft portion 44. The ball 43 has a spherical shape. The shaft portion 44 has a columnar shape. When an end portion of the shaft portion 44 connected to the ball 43 is defined as a distal end and an end portion of the shaft portion 44 connected to the bracket 45 is defined as a proximal end, a diameter of the shaft portion 44 gradually decreases from the proximal end toward the distal end. The bracket 45 is fixed to the vehicle body 20 by, for example, a fastening member such as a screw.

<Back Door 30>

As illustrated in FIG. 1, the back door 30 has a shape corresponding to the door opening 21. The back door 30 is supported by the vehicle body 20 via a hinge or the like so as to be rotatable about a swing axis extending in the width direction of the vehicle 10. The back door 30 rotates about the swing axis to be displaced between a fully opened position where the door opening 21 is fully opened and a fully closed position where the door opening 21 is fully closed. The fully opened position of the back door 30 is a position indicated by a two-dot chain line in FIG. 1, and the fully closed position of the back door 30 is a position indicated by a solid line in FIG. 1. The back door 30 corresponds to an "opening and closing body".

In the following description, in side view of the vehicle 10, an end portion of the back door 30 supported by the vehicle body 20 is referred to as a "proximal end portion", and an end portion opposite to the proximal end portion is referred to as a "distal end portion". In addition, a direction in which the back door 30 moves from the fully closed position to the fully opened position is referred to as an "opening direction", and a direction in which the back door 30 moves from the fully opened position to the fully closed position is referred to as a "closing direction".

The back door 30 includes two ball studs 42 (40) provided on the opposite sides of the door opening 21. The ball studs 42 are fixed at positions closer to the proximal end than to the distal end of the back door 30. As illustrated in FIG. 2, each ball stud 42 has the same configuration as the ball stud 41 provided on the vehicle body 20.

<Opening and Closing Device 50>

As illustrated in FIGS. 1 and 2, each opening and closing device 50 is an elongated shaft-shaped member. FIG. 1 illustrates only the opening and closing device 50 on one side in the width direction of the vehicle 10. The opening and closing device 50 on one side couples together the ball stud 41 of the vehicle body 20 and the ball stud 42 of the back door 30 on the right side in the width direction of the vehicle 10. The opening and closing device 50 on the other side couples together the ball stud 41 of the vehicle body 20 and the ball stud 42 of the back door 30 on the left side in the width direction of the vehicle 10. In the following description, an axial direction of the opening and closing device 50 is simply referred to as an "axial direction". As illustrated in FIG. 2, the opening and closing device 50 includes a linear motion actuator 60 and two coupling portions 70 (71, 72).

<Linear Motion Actuator 60>

The linear motion actuator 60 is a portion excluding opposite end portions of the opening and closing device 50. The linear motion actuator 60 corresponds to a shaft-shaped telescopic "shaft member". The linear motion actuator 60 includes an inner tube 61, an outer tube 62, a motor case 63, an electric motor 64, and a transmission mechanism 65.

The inner tube 61 and the outer tube 62 have a tubular shape. An outer diameter of the inner tube 61 is smaller than an inner diameter of the outer tube 62. A first end of the inner tube 61 is inserted into a second end of the outer tube 62. The inner tube 61 is movable in the axial direction with respect to the outer tube 62. The motor case 63 has a tubular shape similarly to the outer tube 62. A second end of the motor case 63 is coupled to a first end of the outer tube 62.

The electric motor 64 is housed in the motor case 63 together with a drive circuit (not illustrated). The electric motor 64 is driven on the basis of, for example, electric power supplied from a battery of the vehicle 10. In FIG. 2, power supply lines and signal lines extending from the electric motor 64 and the drive circuit are omitted.

The transmission mechanism 65 is housed over the inner tube 61, the outer tube 62, and the motor case 63. The transmission mechanism 65 converts rotational motion of an output shaft of the electric motor 64 into linear motion in the axial direction of the inner tube 61. For example, the transmission mechanism 65 can include a speed reducer and a feed screw mechanism.

The linear motion actuator 60 extends by rotating the output shaft of the electric motor 64 in a first rotation direction. At this time, a protrusion amount of the inner tube 61 with respect to the outer tube 62 increases. In this way, the linear motion actuator 60 applies a load in the opening direction to the back door 30 to perform an opening operation of the back door 30. On the other hand, the linear motion actuator 60 contracts by rotating the output shaft of the electric motor 64 in a second rotation direction opposite to the first rotation direction. At this time, the protrusion amount of the inner tube 61 with respect to the outer tube 62 decreases. In this way, the linear motion actuator 60 applies a load in the closing direction to the back door 30 to perform a closing operation of the back door 30.

<Coupling Portion 70>

As illustrated in FIG. 2, the coupling portions 70 include the coupling portion 71 fixed to a first end in the axial direction of the linear motion actuator 60 and the coupling portion 72 fixed to a second end in the axial direction of the linear motion actuator 60. As illustrated in FIG. 1, when the opening and closing device 50 is attached to the vehicle 10, the coupling portion 71 is coupled to the ball stud 41 of the vehicle body 20, and the coupling portion 72 is coupled to the ball stud 42 of the back door 30. In the linear motion actuator 60, the two coupling portions 70 have the same configuration.

Figure 3:
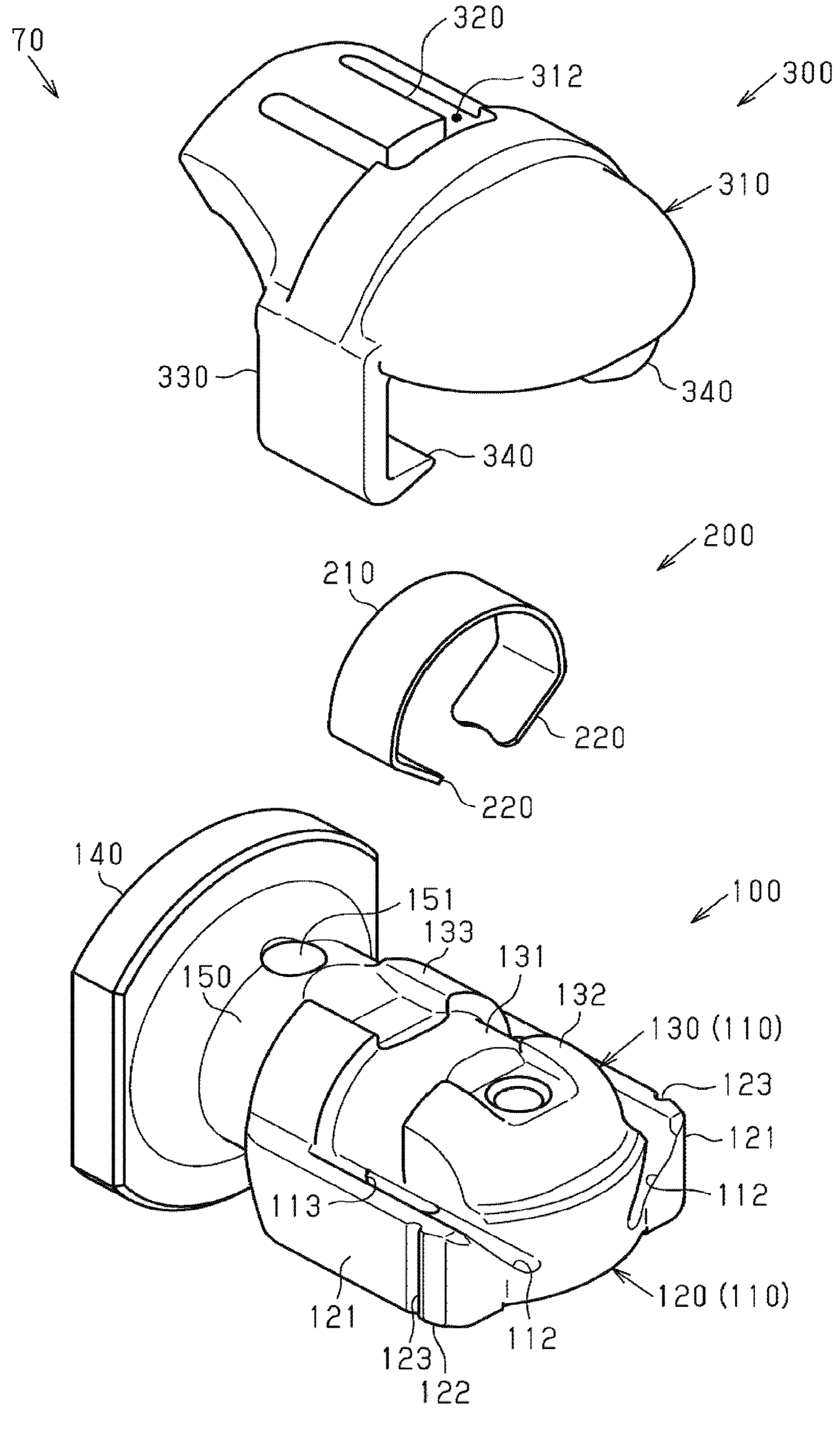
FIG. 3 is an exploded perspective view of a coupling portion of the opening and closing device.
Figure 4:
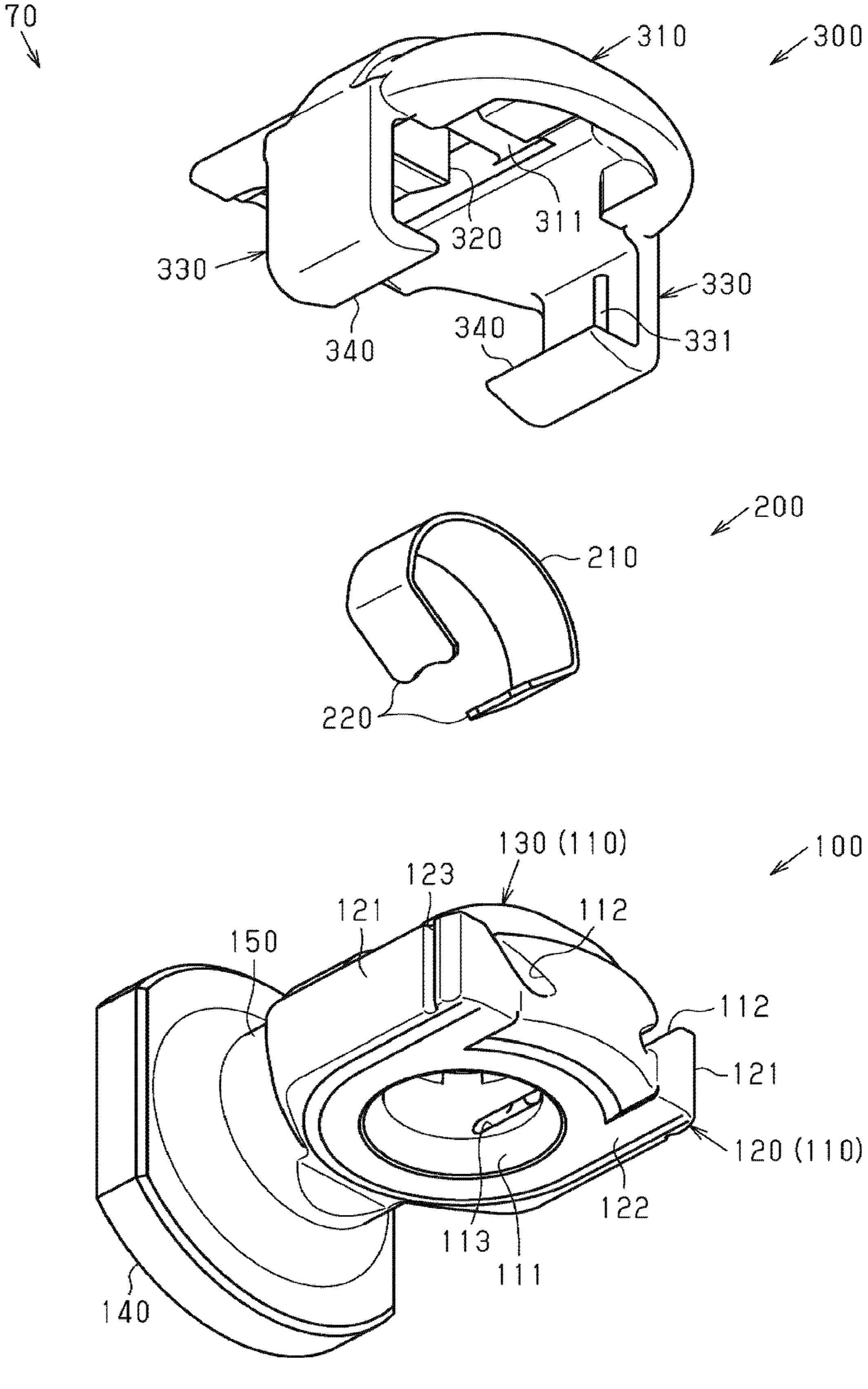
FIG. 4 is an exploded perspective view of the coupling portion.
Figure 5:
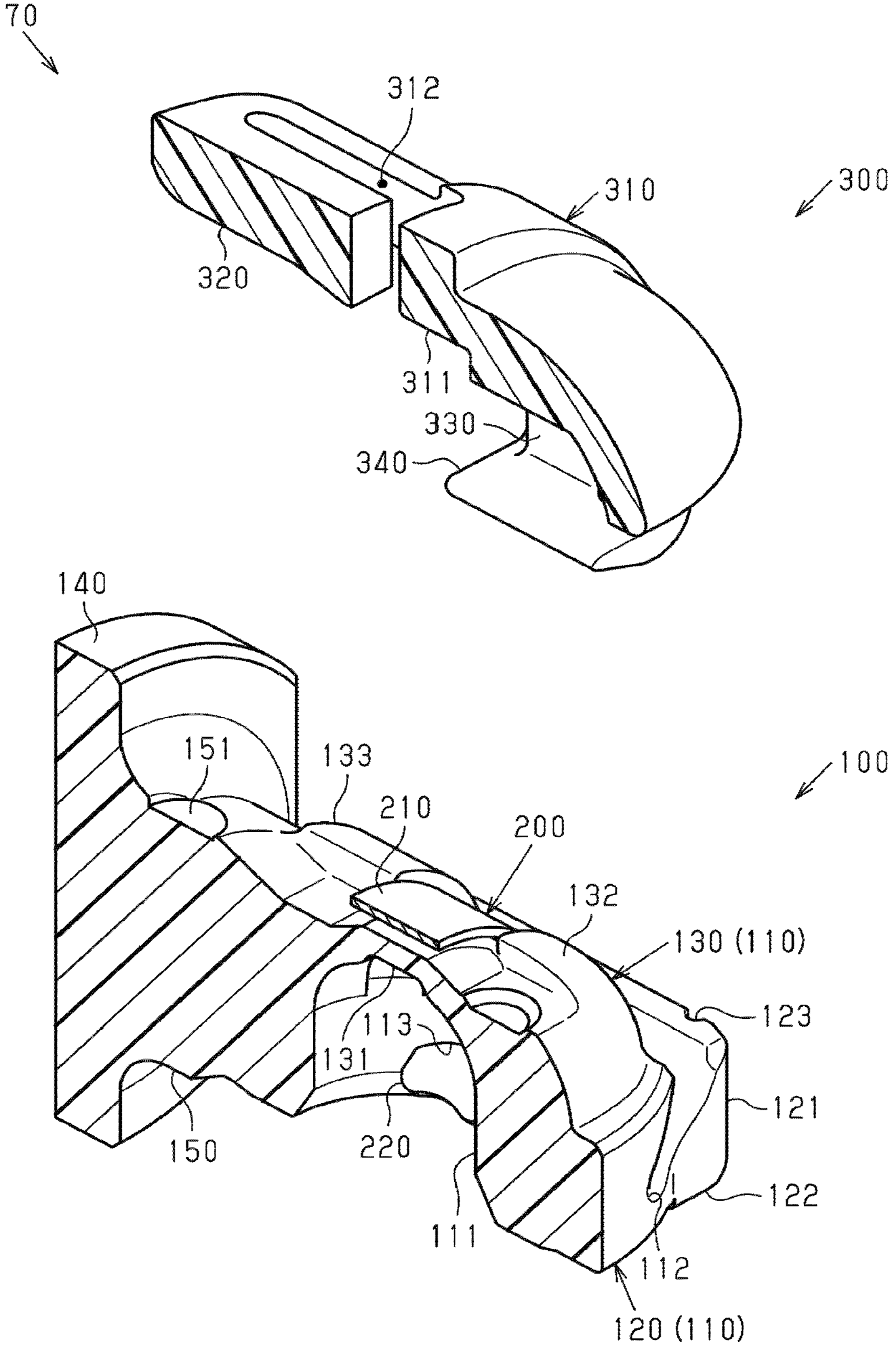
FIG. 5 is an exploded perspective view of the coupling portion.

As illustrated in FIGS. 3 to 5, each coupling portion 70 includes a socket 100, a plate spring 200, and a cover 300. In the following description, a direction perpendicular to the axial direction is referred to as a "width direction", and a direction perpendicular to both the axial direction and the width direction is referred to as a "vertical direction". Furthermore, in the axial direction, an end portion of the coupling portion 70 fixed to the linear motion actuator 60 is referred to as a proximal end, and an end portion on an opposite side to the proximal end of the coupling portion 70 is referred to as a distal end. The width direction and the vertical direction of the coupling portion 70 are independent of the width direction and the vertical direction of the vehicle 10.

<Socket 100>

As illustrated in FIGS. 3 to 5, the socket 100 includes a housing portion 110 that houses the ball 43 of the ball stud 40, a fixing portion 140 fixed to the linear motion actuator 60, and a connecting portion 150 that connects the housing portion 110 and the fixing portion 140. The socket 100 is preferably made of a resin material having high strength and capable of injection molding.

The housing portion 110 includes a first housing wall 120 constituting a lower side of the housing portion 110 and a second housing wall 130 constituting an upper side of the housing portion 110. The housing portion 110 also includes a housing hole 111 having an upward depth direction and two guide grooves 112 extending in the axial direction.

The first housing wall 120 has a cylindrical shape whose height direction coincides with the vertical direction. The first housing wall 120 has two sliding surfaces 121 intersecting the width direction and a locking surface 122 intersecting the vertical direction. The two sliding surfaces 121 are side surfaces in the width direction of the first housing wall 120. Since the two sliding surfaces 121 are parallel, the two sliding surfaces 121 have a constant interval in the axial direction. The two sliding surfaces 121 are provided with recesses 123 at positions close to the distal end in the axial direction. The recesses 123 have a groove shape extending in the vertical direction. Cross-sectional shapes perpendicular to the vertical direction of the recesses 123 are semicircular shapes. The locking surface 122 is a bottom surface of the first housing wall 120. In the present embodiment, the locking surface 122 and the two sliding surfaces 121 are perpendicular to each other.

The second housing wall 130 covers the first housing wall 120 from above. The second housing wall 130 includes a peripheral wall 131 having an arc shape as viewed from the axial direction, and a front wall 132 and a rear wall 133 adjacent to the peripheral wall 131 in the axial direction. An outer diameter of the peripheral wall 131 is smaller than an outer diameter of the front wall 132 and an outer diameter of the rear wall 133. Therefore, a step is formed between the peripheral wall 131 and the front wall 132 and between the peripheral wall 131 and the rear wall 133 in the axial direction. In addition, the centers in the width direction of the front wall 132 and the rear wall 133 are recessed.

As illustrated in FIGS. 4 and 5, the housing hole 111 passes through the first housing wall 120 but does not pass through the second housing wall 130. In the first housing wall 120, an opening of the housing hole 111 is enlarged in diameter. In the first housing wall 120, an inner diameter of the housing hole 111 does not substantially change in the depth direction except the vicinity of the opening. On the other hand, in the second housing wall 130, the inner diameter of the housing hole 111 gradually decreases in the depth direction. The housing hole 111 is a hole for housing the ball 43. Therefore, the housing hole 111 has an inner diameter corresponding to an outer diameter of the ball 43.

As illustrated in FIG. 3, the two guide grooves 112 extend from a distal end toward a proximal end of the first housing wall 120 in the axial direction. The two guide grooves 112 are located at an interval in the width direction. In front view in the axial direction, the guide grooves 112 are inclined upward as going outward in the width direction. As illustrated in FIGS. 4 and 5, the two guide grooves 112 communicate with the housing hole 111. Here, a hole through which each of the two guide grooves 112 communicates with the housing hole 111 is referred to as a communication hole 113. A position where the communication hole 113 is formed in the axial direction coincides with a position where the peripheral wall 131 is formed in the axial direction.

As illustrated in FIG. 3, the fixing portion 140 has a disk shape whose plate thickness direction coincides with the axial direction. The fixing portion 140 is fixed to the end portion of the linear motion actuator 60. The connecting portion 150 has a columnar shape whose height direction coincides with the axial direction. A circular marking 151 is provided on an upper surface of the connecting portion 150. Preferably, the marking 151 is colored in a color that can be easily visually recognized by an operator or has a reflectance different from that of other portions. The shape of the marking 151 is not necessarily circular.

<Plate Spring 200>

As illustrated in FIGS. 3 and 4, the plate spring 200 has a C shape in front view in the axial direction. The plate spring 200 includes a base portion 210 having an arc shape and two clamping portions 220 that individually linearly extend from opposite end portions in a longitudinal direction of the base portion 210. In a distal end portion of each of the clamping portions 220, the center in the axial direction is recessed more than opposite end portions in the axial direction. In other words, the distal end portion of the clamping portion 220 has a shape corresponding to the ball 43. The plate spring 200 corresponds to an "elastic body". The plate spring 200 may be formed by, for example, bending a rectangular plate-shaped metal plate.

Figure 6:
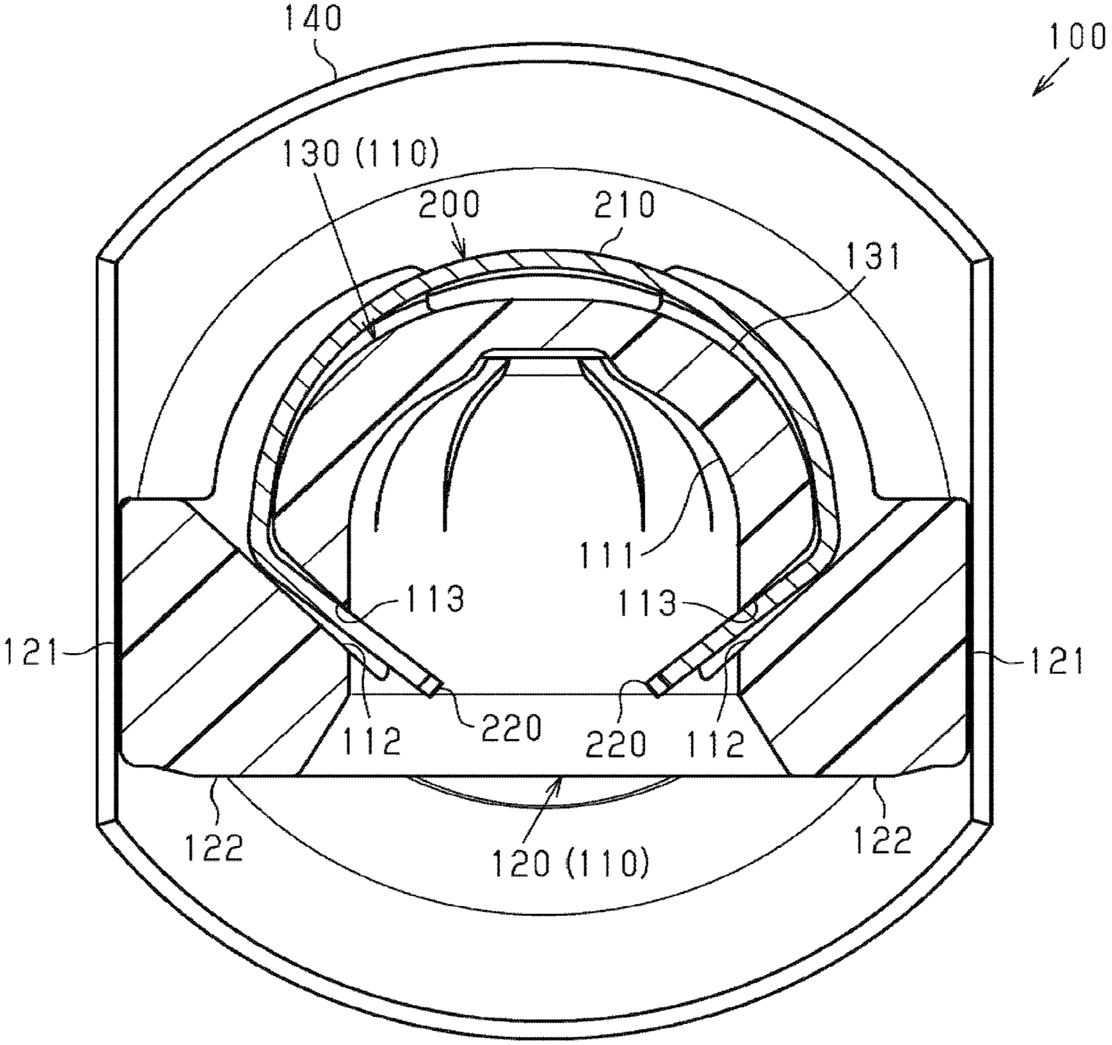
FIG. 6 is a cross-sectional view of a socket and a plate spring of the coupling portion.

As illustrated in FIGS. 5 and 6, the plate spring 200 is mounted on the socket 100. The plate spring 200 is mounted on the socket 100 by being pushed toward a proximal end in the axial direction of the socket 100 through the two guide grooves 112 of the socket 100. At this time, the base portion 210 of the plate spring 200 extends along an outer peripheral surface of the peripheral wall 131 of the socket 100. In addition, the two clamping portions 220 of the plate spring 200 are individually inserted through the two guide grooves 112 and are individually inserted through the two communication holes 113. As a result, the distal ends of the two clamping portions 220 of the plate spring 200 are located inside the housing hole 111 of the socket 100. Furthermore, the two clamping portions 220 of the plate spring 200 face each other in the width direction.

<Cover 300>

As illustrated in FIGS. 3 to 5, the cover 300 includes an upper wall 310, a regulating arm 320, two side walls 330, and two locking portions 340. The cover 300 is preferably made of a resin material having high strength and capable of injection molding.

The upper wall 310 has a size capable of covering the housing portion 110 and the connecting portion 150 of the socket 100. The upper wall 310 has a pressing portion 311 that presses the plate spring 200 mounted on the socket 100. The upper wall 310 also has a through hole 312 that passes through the upper wall 310 in the vertical direction. The pressing portion 311 is a surface facing downward of the upper wall 310. The pressing portion 311 has a planar shape. The pressing portion 311 is adjacent to the through hole 312 in the axial direction and is located at the center in the width direction. The through hole 312 has a rectangular shape whose shorter direction coincides with the width direction and whose longer direction coincides with the axial direction. The through hole 312 is located at the center in the width direction.

The regulating arm 320 extends along the axial direction from a surface located on the proximal end side out of two surfaces intersecting the axial direction of the through hole 312. A proximal end of the regulating arm 320 is a fixed end, and a distal end of the regulating arm 320 is a free end. In this respect, the proximal end of the regulating arm 320 corresponds to "one end in the axial direction", and the distal end of the regulating arm 320 corresponds to "the other end in the axial direction". A lower surface of the distal end portion of the regulating arm 320 is inclined downward toward the distal end in the axial direction. A distal end surface of the regulating arm 320 is perpendicular to the axial direction.

The two side walls 330 individually extend downward from opposite end portions in the width direction of the upper wall 310. As illustrated in FIG. 4, the two side walls 330 include protrusions 331 protruding inward in the width direction over the vertical direction. In this respect, the protrusions 331 have a rib shape whose longitudinal direction coincides with the vertical direction. Cross-sectional shapes perpendicular to the vertical direction of the protrusions 331 are semicircular shapes. That is, the cross-sectional shapes perpendicular to the vertical direction of the protrusions 331 correspond to the cross-sectional shapes perpendicular to the vertical direction of the recesses 123 of the socket 100.

The two locking portions 340 individually extend inward in the width direction from lower end portions of the two side walls 330. The locking portions 340 have a claw shape tapered toward their distal ends. Upper surfaces of the locking portions 340 are perpendicular to the side wall 330.

Operation of Present Embodiment

An operation in a case where the opening and closing device 50 is attached to the vehicle 10 will be explained with reference to FIGS. 7 to 10.

Figure 7:
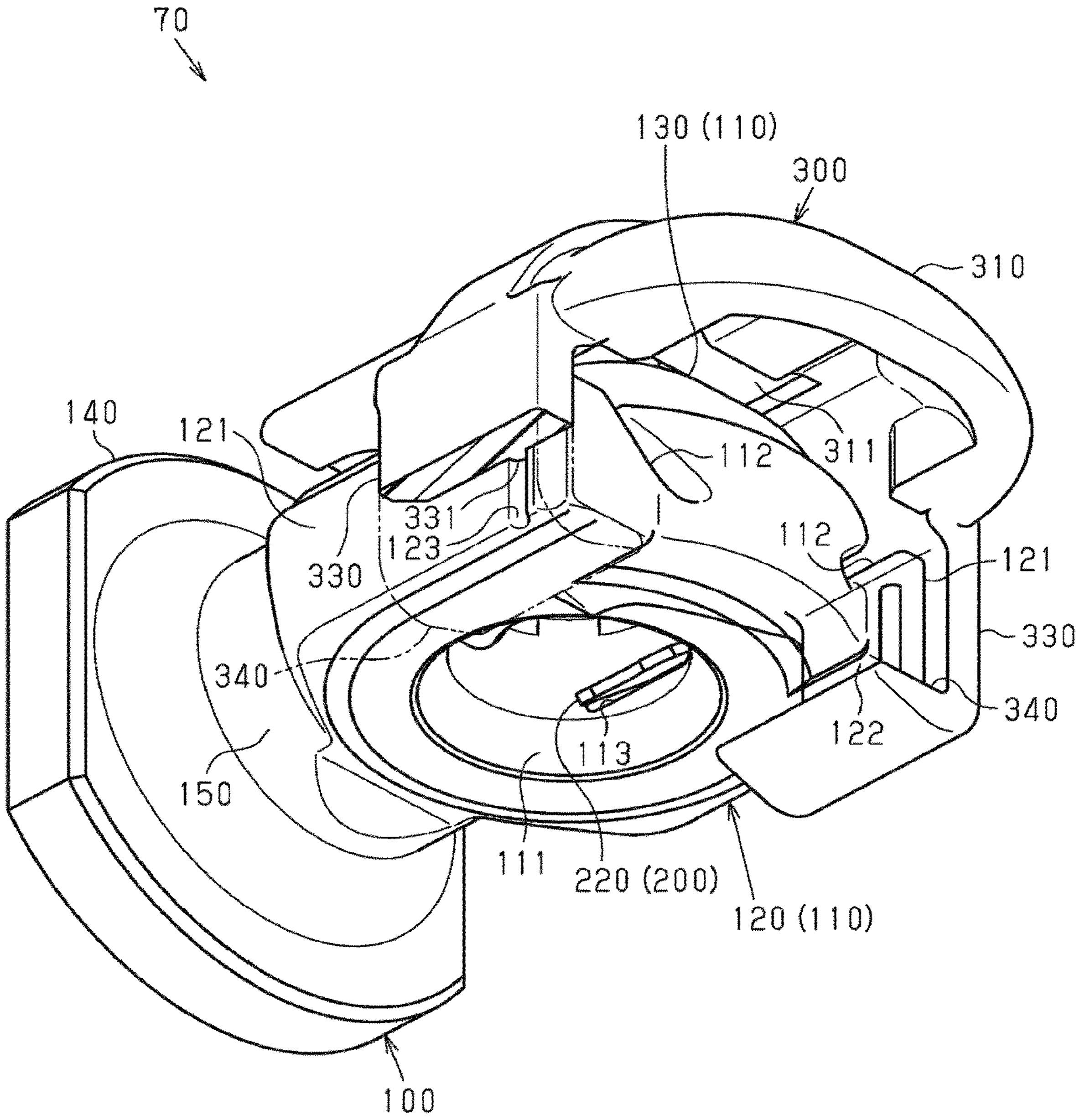
FIG. 7 is a perspective view of the coupling portion before being coupled to a ball stud.
Figure 8:
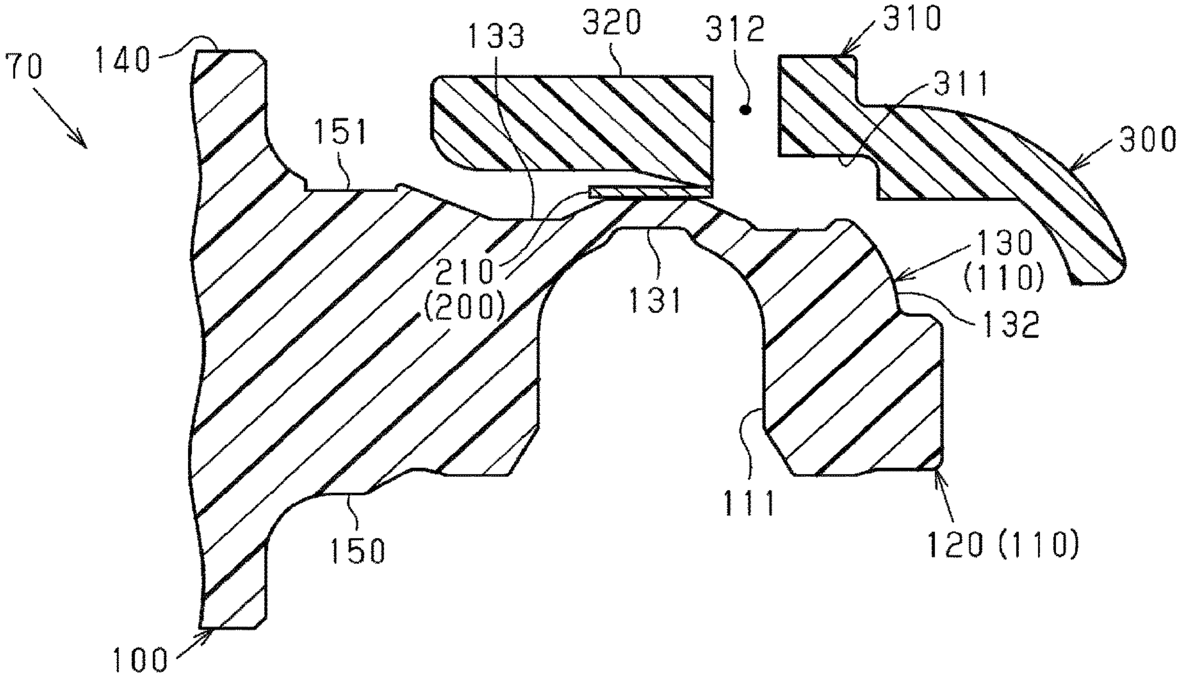
FIG. 8 is a cross-sectional view of the coupling portion before being coupled to the ball stud.

As illustrated in FIGS. 7 and 8, in the opening and closing device 50 before being attached to the vehicle 10, the cover 300 is mounted on the socket 100. A mounting position of the cover 300 on the socket 100 at this time is referred to as an "allowing position".

When the mounting position of the cover 300 is the allowing position, the side walls 330 of the cover 300 are in contact with the sliding surfaces 121 of the socket 100 on opposite sides in the width direction of the coupling portion 70. In other words, the two side walls 330 of the cover 300 sandwich the first housing wall 120 of the socket 100 in the width direction. In this way, the cover 300 is positioned with respect to the socket 100 in the width direction. Furthermore, the protrusions 331 of the side walls 330 of the cover 300 are fitted into the recesses 123 of the sliding surfaces 121 of the socket 100. In this way, the cover 300 is positioned with respect to the socket 100 in the axial direction.

As illustrated in FIG. 8, the distal end portion of the regulating arm 320 of the cover 300 pushes downward the base portion 210 of the plate spring 200 mounted on the socket 100. On the other hand, as illustrated in FIG. 7, the locking portions 340 of the cover 300 are locked to the locking surface 122 of the socket 100. In other words, the locking portions 340 of the cover 300 are in contact with the locking surface 122 of the socket 100 from below. That is, the regulating arm 320 and the locking portions 340 of the cover 300 sandwich the housing portion 110 of the socket 100 and the plate spring 200 in the vertical direction. In this way, the cover 300 is positioned with respect to the socket 100 in the vertical direction. At this time, as illustrated in FIG. 8, the plate spring 200 is sandwiched between the peripheral wall 131 of the socket 100 and the regulating arm 320 of the cover 300 in the vertical direction.

As described above, the cover 300 is not separated from the socket 100 at the allowing position. The allowing position is not a proper mounting position of the cover 300 on the socket 100, but a temporary mounting position for integrally handling the cover 300 with the socket 100. When the cover 300 is located at the allowing position, the cover 300 does not cover the marking 151 of the socket 100. Therefore, when the socket 100 is viewed from above, the marking 151 is in a visible state.

When the opening and closing device 50 is attached to the vehicle 10, the coupling portion 71 of the opening and closing device 50 is coupled to the ball stud 41 of the vehicle body 20. The coupling portion 72 of the opening and closing device 50 is also coupled to the ball stud 42 of the back door 30. Specifically, as illustrated in FIG. 9, each coupling portion 70 of the opening and closing device 50 is pressed against the ball stud 40, so that the ball 43 is inserted into the housing hole 111 of the socket 100.

Figure 9:
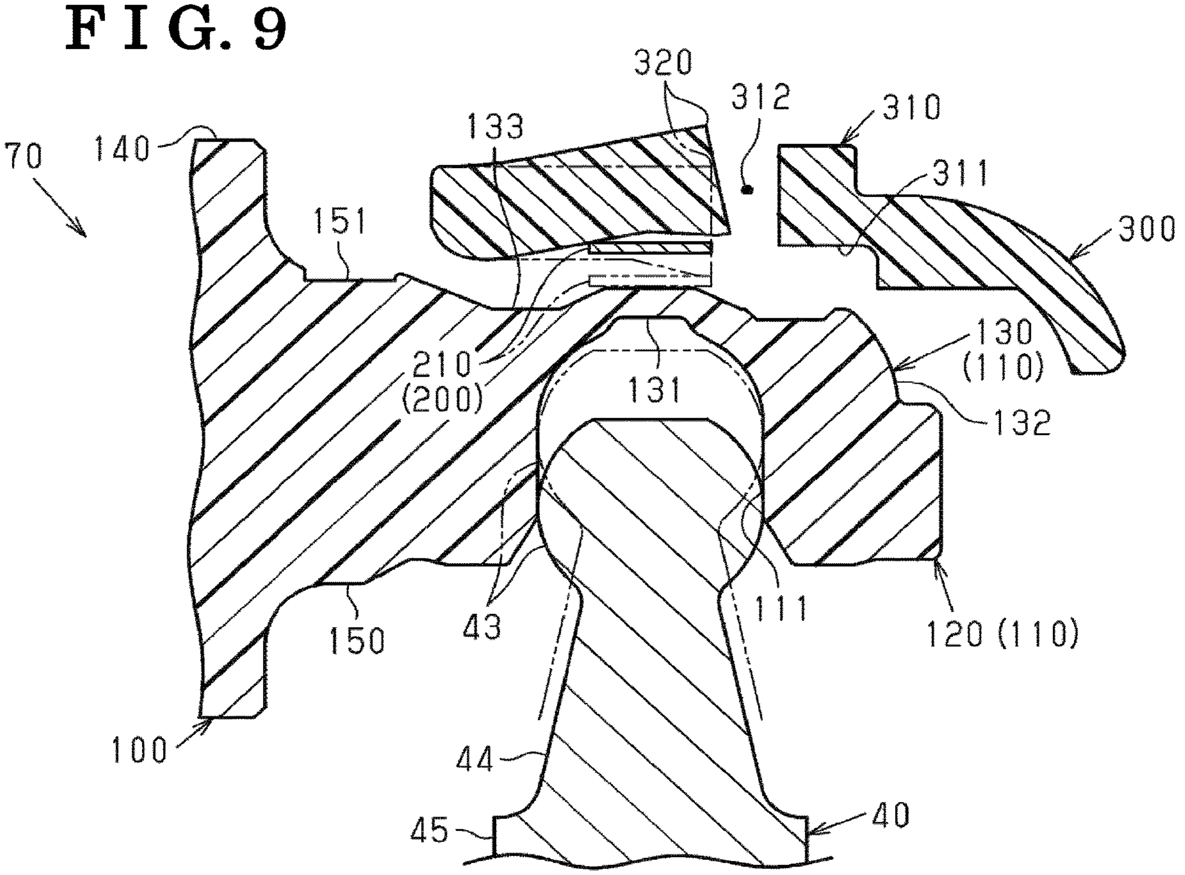
FIG. 9 is a cross-sectional view of the coupling portion being coupled to the ball stud.

As indicated by a solid line in FIG. 9, the ball 43 enters the housing hole 111 while spreading the two clamping portions 220 of the plate spring 200 apart. At this time, the plate spring 200 is displaced upward in an insertion direction of the ball 43 by a reaction force received from the ball 43. Since the distal end of the regulating arm 320 is in contact with the plate spring 200, the plate spring 200 is displaced upward together with the regulating arm 320 by the reaction force received from the ball 43. As described above, when the cover 300 is located at the allowing position, the displacement of the plate spring 200 with respect to the socket 100 is allowed. This enables the ball 43 to be inserted into the socket 100 while elastically deforming the plate spring 200. When a portion having the largest diameter of the ball 43 passes between the two clamping portions 220 of the plate spring 200 in the vertical direction, the plate spring 200 starts to be restored. That is, the base portion 210 of the plate spring 200 is displaced downward together with the regulating arm 320.

When the ball 43 reaches the bottom of the housing hole 111 as indicated by a two-dot chain line in FIG. 9, the ball 43 is sandwiched in the width direction between the two clamping portions 220 of the plate spring 200. In this way, the ball 43 is held by the socket 100 and the plate spring 200, and a ball joint is formed by the ball 43 and the socket 100.

Thereafter, the cover 300 is moved in the axial direction with respect to the socket 100. At this time, the protrusions 331 of the side walls 330 of the cover 300 slide on the sliding surfaces 121 of the socket 100, and the locking portions 340 of the cover 300 slide on the locking surface 122 of the socket 100. The regulating arm 320 of the cover 300 also slides on the base portion 210 of the plate spring 200.

Figure 10:
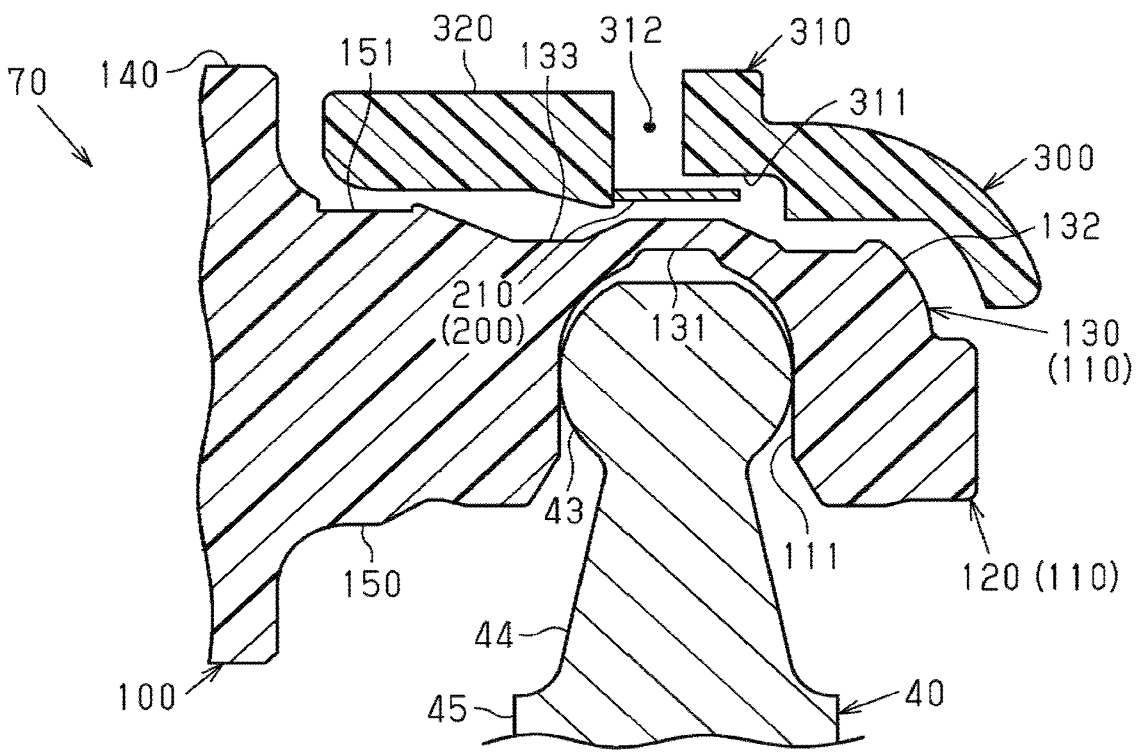
FIG. 10 is a cross-sectional view of the coupling portion after being coupled to the ball stud.

When the cover 300 moves to a restricting position illustrated in FIG. 10, the distal end of the regulating arm 320 of the cover 300 and the plate spring 200 face each other in the axial direction. Furthermore, the plate spring 200 is disposed between the pressing portion 311 of the cover 300 and the peripheral wall 131 of the socket 100 in the vertical direction. At this time, the regulating arm 320 and the plate spring 200 may be in contact with each other, or a slight gap may be formed between the regulating arm 320 and the plate spring 200. Similarly, the pressing portion 311 and the plate spring 200 may be in contact with each other, or a slight gap may be formed between the pressing portion 311 and the plate spring 200. As described above, when the cover 300 is located at the restricting position, the displacement of the plate spring 200 with respect to the socket 100 is restricted. Therefore, even when a load acts in a direction in which ball 43 is pulled out from the socket 100, an interval between the two clamping portions 220 of the plate spring 200 is less likely to be widened, and the base portion 210 of the plate spring 200 is less likely to be displaced upward. As a result, the ball 43 is less likely to fall off from the socket 100. The socket 100 and the cover 300 preferably have a configuration for inhibiting the cover 300 from moving in the axial direction from the restricting position.

The cover 300 is moved to the restricting position after the ball 43 is inserted into the socket 100. In this respect, the restricting position is a position where the displacement of the plate spring 200 with respect to the socket 100 is restricted, and is a position for inhibiting the ball 43 from unexpectedly falling off from the socket 100. When the cover 300 is located at the restricting position, the cover 300 covers the marking 151 of the socket 100. Therefore, when the socket 100 is viewed from above, the marking 151 is in an invisible state.

Effects of Present Embodiment (1) An opening and closing device couples together a vehicle body having an opening and an opening and closing body that opens and closes the opening, and extends to perform an opening operation of the opening and closing body, at least one of the vehicle body and the opening and closing body including a ball stud including a ball, the opening and closing device including: a shaft member having a shaft shape and being telescopic in an axial direction; a socket fixed to at least one end portion of the shaft member and constituting a ball joint together with the ball; an elastic body supported by the socket and configured to hold the ball together with the socket; and a cover mounted on the socket at one of an allowing position where displacement of the elastic body with respect to the socket is allowed and a restricting position where the displacement of the elastic body with respect to the socket is restricted.

With the above configuration, when the opening and closing device is attached to the vehicle, the mounting position of the cover on the socket is the allowing position. In this case, the elastic body is easily displaced with respect to the socket, so that it is possible to house the ball in the socket while deforming the elastic body. When the ball is housed in the socket, the mounting position of the cover is changed from the allowing position to the restricting position. The elastic body thereby becomes less likely to be deformed with respect to the socket, so that the ball is less likely to fall off from the socket. In this way, the opening and closing device can be easily attached to and hardly detached from the vehicle by changing the mounting position of the cover on the socket.

In other words, when the opening and closing device 50 is attached to the vehicle 10, the mounting position of the cover 300 on the socket 100 is the allowing position. In this case, the plate spring 200 is easily displaced with respect to the socket 100, so that it is possible to house the ball 43 in the socket 100 while elastically deforming the plate spring 200. When the ball 43 is housed in the socket 100, the mounting position of the cover 300 is changed from the allowing position to the restricting position. The plate spring 200 thereby becomes less likely to be elastically deformed with respect to the socket 100, so that the ball 43 is less likely to fall off from the socket 100. In this way, the opening and closing device 50 can be easily attached to and hardly detached from the vehicle 10.

The opening and closing device can be easily attached to and hardly detached from the vehicle.

(2) In the opening and closing device, when a direction in which the ball is inserted into the socket is defined as an insertion direction, the socket includes a housing portion including a peripheral wall having an arc shape as viewed from a direction perpendicular to the insertion direction, the housing portion housing the ball while covering the ball with the peripheral wall, the elastic body is a plate spring including a base portion that extends along an outer peripheral surface of the peripheral wall and two clamping portions that individually extend from opposite ends of the base portion to sandwich the ball housed in the housing portion, and the cover includes a pressing portion that restricts displacement of the plate spring by sandwiching the base portion of the plate spring in the insertion direction together with the peripheral wall at the restricting position.

With the above configuration, when the ball is housed in the socket or taken out from the socket, the ball passes between the two clamping portions of the plate spring while widening the interval between the two clamping portions. At this time, the base portion of the plate spring seeks to lift up from the peripheral wall by the load acting on the two clamping portions. In this respect, the pressing portion of the cover restricts the displacement of the plate spring by sandwiching the base portion of the plate spring together with the peripheral wall of the socket at the restricting position. Therefore, the opening and closing device can further inhibit the ball from falling off from the socket after the cover is mounted at the restricting position.

In other words, when the ball 43 is housed in the socket 100 or taken out from the socket 100, the ball 43 passes between the two clamping portions 220 of the plate spring 200 while widening the interval between the two clamping portions 220. At this time, the base portion 210 of the plate spring 200 seeks to lift up from the peripheral wall 131 by the load acting on the two clamping portions 220. In this respect, the pressing portion 311 of the cover 300 restricts the displacement of the plate spring 200 by sandwiching the base portion 210 of the plate spring 200 together with the peripheral wall 131 at the restricting position. Therefore, the opening and closing device 50 can further inhibit the ball 43 from falling off from the socket 100 after the cover 300 is mounted at the restricting position.

(3) In the opening and closing device, the cover includes two side walls that sandwich the housing portion of the socket in a direction perpendicular to the axial direction, one of the housing portion and the side walls includes a recess, and the other of the housing portion and the side walls includes a protrusion that is fitted into the recess when the cover is located at the allowing position.

With the above configuration, when the mounting position of the cover is the allowing position, the two side walls of the cover sandwich the housing portion of the socket, and the protrusion is fitted into the recess. Therefore, the opening and closing device can inhibit the cover located at the allowing position from falling off from the socket.

In other words, in the opening and closing device 50, when the mounting position of the cover 300 is the allowing position, the two side walls 330 of the cover 300 sandwich the housing portion 110 of the socket 100. Furthermore, the two protrusions 331 of the cover 300 are individually fitted into the two recesses 123 of the socket 100. Therefore, the opening and closing device 50 can inhibit the cover 300 located at the allowing position from falling off from the socket 100.

(4) In the opening and closing device, the cover includes a regulating arm that extends in the axial direction and in which one end in the axial direction is a fixed end and the other end in the axial direction is a free end, and the free end of the regulating arm sandwiches the base portion of the plate spring together with the peripheral wall when the cover is located at the allowing position, and restricts displacement in the axial direction of the plate spring when the cover is located at the restricting position.

With the above configuration, in the opening and closing device, when the cover is located at the allowing position, the regulating arm can inhibit the plate spring from moving with respect to the socket. When the cover is located at the restricting position, the regulating arm can inhibit the plate spring from moving in the axial direction with respect to the socket. In this way, the opening and closing device can provide different functions to the regulating arm according to the position of the cover.

In other words, in the opening and closing device 50, the covering state of the marking 151 changes according to the position of the cover 300. Specifically, when the cover 300 is located at the allowing position, the marking 151 is not covered. On the other hand, when the cover 300 is located at the restricting position, the marking 151 is covered. Therefore, the opening and closing device 50 can indicate whether the position of the cover 300 is the allowing position or the restricting position according to the covering state of the marking 151. As a result, the opening and closing device 50 can inhibit an operator who attaches the opening and closing device 50 to the vehicle 10 from forgetting to change the cover 300 from the allowing position to the restricting position.

(5) In the opening and closing device, the socket includes a marking, one of the allowing position and the restricting position is a position where the cover does not cover the marking, and the other of the allowing position and the restricting position is a position where the cover covers the marking.

With the above configuration, in the opening and closing device, the covering state of the marking changes according to the position of the cover. Therefore, the opening and closing device can indicate whether the position of the cover is the allowing position or the restricting position according to the covering state of the marking.

In other words, as illustrated in FIG. 8, when the cover 300 is located at the allowing position, the distal end of the regulating arm 320 is in contact with the base portion 210 of the plate spring 200 from above. Therefore, the plate spring 200 is inhibited from unexpectedly moving with respect to the socket 100 during carriage of the opening and closing device 50. In addition, as indicated by a solid line in FIG. 9, when the cover 300 is inserted into the socket 100, the distal end of the regulating arm 320 is displaced upward by being pushed by the base portion 210 of the plate spring 200. Here, the regulating arm 320 has a cantilever shape, and a portion of the regulating arm 320 pushed by the base portion 210 of the plate spring 200 is the distal end portion. As a result, it can be said that the regulating arm 320 is easily displaced. This inhibits an increase in the load in inserting the ball 43 into the socket 100 as a result of the regulating arm 320 excessively restricting the displacement of the base portion 210 of the plate spring 200.

(6) As illustrated in FIG. 10, when the cover 300 is located at the restricting position, the distal end of the regulating arm 320 faces the base portion 210 of the plate spring 200 in the axial direction. Therefore, at the time of the opening and closing operations of the back door 30, specifically, when the ball 43 moves with respect to the socket 100, the regulating arm 320 restricts movement of the plate spring 200 that seeks to move toward the proximal end in the axial direction.

Modification Examples

The present embodiment can be modified and implemented as follows. The present embodiment and the following modification examples can be implemented in combination with each other within a range not technically contradictory.

In the socket 100 and the cover 300, the shapes of the recesses 123 and the protrusions 331 can be changed as appropriate. For example, the recesses 123 and the protrusions 331 may have a male shape and a female shape constituting a so-called snap-fit. The above embodiment can also be replaced with a configuration in which the socket 100 has the protrusions 331 and the cover 300 has the recesses 123.

The marking 151 may be provided on the cover 300. In this case, the marking 151 is preferably exposed when the cover 300 is located at the allowing position, and the marking 151 is preferably hidden by the socket 100 when the cover 300 is located at the restricting position.

The marking 151 may be covered by the cover 300 when the cover 300 is located at the allowing position and exposed when the cover 300 is located at the restricting position.

The plate spring 200 may be an elastic body made of an elastomer such as rubber and resin. In this case, it is preferable that at least a part of the elastic body is located above the peripheral wall 131 of the socket 100, and at least a part of the elastic body is located inside the housing hole 111 of the socket 100.

The cover 300 may be positioned at the allowing position or the restricting position by a frictional force with the socket 100. That is, the cover 300 is not limited to one positioned on the socket 100 with the protrusions 331 fitted into the recesses 123.

The cover 300 does not have to include the regulating arm 320.

In the above embodiment, the depth direction of the housing hole 111 of the socket 100 fixed to the first end of the linear motion actuator 60 and the depth direction of the housing hole 111 of the socket 100 fixed to the second end of the linear motion actuator 60 are directed in the same direction. Depending on how the ball studs 40 are fixed to the vehicle body 20 and the back door 30, the depth directions of the housing holes 111 of the two sockets 100 is directed in different directions in some cases.

One of the coupling portions 70 of the opening and closing device 50 does not need to constitute the ball joint together with the vehicle body 20 or the back door 30. One of the coupling portions 70 of the opening and closing device 50 may constitute a universal joint such as a hook joint together with the vehicle body 20 or the back door 30.

The opening and closing device 50 may be a so-called gas spring or gas damper. In this case, a portion extended by a reaction force of gas corresponds to the "shaft member". The opening and closing device according to this modification example can apply a load in the opening direction to the back door 30, but cannot apply a load in the closing direction to the back door 30. That is, the opening and closing device can open the back door 30 but cannot close the back door 30.

The opening and closing body provided with the opening and closing device 50 may be a door other than the back door 30. For example, the opening and closing body may be a front door and a rear door as a swing door.

The opening and closing body as the opening and closing target of the opening and closing device 50 is not necessarily a door. For example, the opening and closing body may be a hood panel or a fuel lid.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opening and closing device that couples together a vehicle body having an opening and an opening and closing body that opens and closes the opening, and extends to perform an opening operation of the opening and closing body, at least one of the vehicle body and the opening and closing body including a ball stud including a ball, the opening and closing device comprising:

a shaft member having a shaft shape and being telescopic in an axial direction;

a socket fixed to at least one end portion of the shaft member and constituting a ball joint together with the ball;

an elastic body supported by the socket and configured to hold the ball together with the socket; and a cover mounted on the socket at one of an allowing position where displacement of the elastic body with respect to the socket is allowed and a restricting position where the displacement of the elastic body with respect to the socket is restricted, wherein when a direction in which the ball is inserted into the socket is defined as an insertion direction, the socket includes a housing portion including a peripheral wall having an arc shape as viewed from a direction perpendicular to the insertion direction, the housing portion housing the ball while covering the ball with the peripheral wall, the elastic body is a plate spring including a base portion that extends along an outer peripheral surface of the peripheral wall and two clamping portions that individually extend from opposite ends of the base portion to sandwich the ball housed in the housing portion, the cover includes a pressing portion that restricts displacement of the plate spring by sandwiching the base portion of the plate spring in the insertion direction together with the peripheral wall at the restricting position, the cover includes two side walls that sandwich the housing portion of the socket in a direction perpendicular to the axial direction, one of the housing portion and the side walls includes a recess, and the other of the housing portion and the side walls includes a protrusion that is fitted into the recess when the cover is located at the allowing position.

2. An opening and closing device that couples together a vehicle body having an opening and an opening and closing body that opens and closes the opening, and extends to perform an opening operation of the opening and closing body, at least one of the vehicle body and the opening and closing body including a ball stud including a ball, the opening and closing device comprising:

a shaft member having a shaft shape and being telescopic in an axial direction;

a socket fixed to at least one end portion of the shaft member and constituting a ball joint together with the ball;

an elastic body supported by the socket and configured to hold the ball together with the socket; and a cover mounted on the socket at one of an allowing position where displacement of the elastic body with respect to the socket is allowed and a restricting position where the displacement of the elastic body with respect to the socket is restricted, wherein when a direction in which the ball is inserted into the socket is defined as an insertion direction, the socket includes a housing portion including a peripheral wall having an arc shape as viewed from a direction perpendicular to the insertion direction, the housing portion housing the ball while covering the ball with the peripheral wall, the elastic body is a plate spring including a base portion that extends along an outer peripheral surface of the peripheral wall and two clamping portions that individually extend from opposite ends of the base portion to sandwich the ball housed in the housing portion, the cover includes a pressing portion that restricts displacement of the plate spring by sandwiching the base portion of the plate spring in the insertion direction together with the peripheral wall at the restricting position, the cover includes a regulating arm that extends in the axial direction and in which one end in the axial direction is a fixed end and the other end in the axial direction is a free end, and the free end of the regulating arm sandwiches the base portion of the plate spring together with the peripheral wall when the cover is located at the allowing position, and restricts displacement in the axial direction of the plate spring when the cover is located at the restricting position.

3. An opening and closing device that couples together a vehicle body having an opening and an opening and closing body that opens and closes the opening, and extends to perform an opening operation of the opening and closing body, at least one of the vehicle body and the opening and closing body including a ball stud including a ball, the opening and closing device comprising:

a shaft member having a shaft shape and being telescopic in an axial direction:

a socket fixed to at least one end portion of the shaft member and constituting a ball joint together with the ball;

an elastic body supported by the socket and configured to hold the ball together with the socket; and a cover mounted on the socket at one of an allowing position where displacement of the elastic body with respect to the socket is allowed and a restricting position where the displacement of the elastic body with respect to the socket is restricted, wherein when a direction in which the ball is inserted into the socket is defined as an insertion direction, the socket includes a housing portion including a peripheral wall having an arc shape as viewed from a direction perpendicular to the insertion direction, the housing portion housing the ball while covering the ball with the peripheral wall, the elastic body is a plate spring including a base portion that extends along an outer peripheral surface of the peripheral wall and two clamping portions that individually extend from opposite ends of the base portion to sandwich the ball housed in the housing portion, the cover includes a pressing portion that restricts displacement of the plate spring by sandwiching the base portion of the plate spring in the insertion direction together with the peripheral wall at the restricting position, the socket includes a marking, one of the allowing position and the restricting position is a position where the cover does not cover the marking, and the other of the allowing position and the restricting position is a position where the cover covers the marking.

* * * * *